United States Patent [19]

Le Goff et al.

[11] Patent Number: 5,332,546
[45] Date of Patent: Jul. 26, 1994

[54] WORKING FLUID FOR ABSORPTION HEAT PUMPS OPERATING AT VERY HIGH TEMPERATURES

[75] Inventors: Pierre Le Goff; Bai Q. Liu, both of Nancy; Dimitrios Antonakas, Saint Antonin sur Bayon; Gabriel Marbach, Manosque, all of France

[73] Assignee: Commisariat A l'Energie Atomique, France

[21] Appl. No.: 805,312

[22] Filed: Dec. 10, 1991

[30] Foreign Application Priority Data

Dec. 14, 1990 [FR] France .................. 90 15697

[51] Int. Cl.$^5$ .............................................. C22C 7/00
[52] U.S. Cl. ................................. 420/526; 62/101; 62/114; 62/476; 62/499; 62/324.1; 252/67; 252/71; 420/400; 420/591
[58] Field of Search ............ 420/526, 400, 591; 62/101, 114, 476, 499, 324.1; 252/67, 71

[56] References Cited

U.S. PATENT DOCUMENTS 4,386,050 5/1983 Anderson .................. 420/526

Primary Examiner—Richard O. Dean
Assistant Examiner—Robert R. Koehler
Attorney, Agent, or Firm—Pearne, Gordon, McCoy & Granger

[57] ABSTRACT

Working fluid for absorption heat pumps operating at very high temperature, particularly 200° to 1000° C., said working fluid being a mixture of at least two constituents, characterized in that the working fluid is constituted by a mixture of at least two chemical elements, whereof the first called the "solvent" is much more volatile than the others called "solutes" at the temperature of the mixture, the nature and proportions of each of the chemical elements in the mixture being chosen in such a way that the Vapour pressure of the mixture is significantly below that of the first, more volatile chemical element throughout the operating cycle of the working fluid in the pump.

These chemical elements can in particular be metals such as mercury or sodium, or metalloids such as sulphur.

1 Claim, 6 Drawing Sheets

WORKING FLUID FOR ABSORPTION HEAT PUMPS OPERATING AT VERY HIGH TEMPERATURES

The present invention relates in general terms to apparatuses known as absorption heat pumps which are thermodynamic apparatuses in which heat is removed from a "cold source" to pass it into a "hot source", the counterpart of this transformation being, in accordance with thermodynamic laws, the reception by the apparatus of a certain energy from the outside.

In known manner, these heat pumps operate with the aid of a liquid binary mixture to which is passed a closed cycle, where it successively undergoes a concentration in a separator and a dilution in a mixer.

To provide a better understanding of the invention, details will firstly be given of the operation of a known absorption heat pump using an ordinary mixture of water and caustic soda. This mixture is used for its intrinsic thermodynamic properties, based on the fact that the absorption of water vapour or stream in a soda solution is exothennic, whereas it is necessary to heat the mixture for separating the two constituents by vaporization of water and, on the other hand, in the fact that the non-volatile soda greatly reduces the vapour pressure of the water of the solution.

This per se known heat pump is essentially constituted by four apparatuses visible in FIG. 1. There is an evaporator E into which passes the pure liquid water, which evaporates at 60° C. and gives vapour or steam under 150 mmHg. Into the absorber A flows a concentrated caustic soda solution (i.e. the "concentrate") at 1 kg of NaOH/kg of water. The steam is absorbed in the form of a slightly dilute solution, namely 0.9 kg of NaOH/kg of water (i.e. the "diluate"). This absorption is exothermic. Absorption takes place at 100° C. (cf. the graph of FIG. 2) and the thus produced heat is discharged to the outside by a heat exchanger, where there is a gradient of approximately 5° C. and is consequently available at 95° C. The complete evaporator E and the absorber A constitute the pump mixer stage. There is also a boiler-desorber B, whose function is to regenerate the solution and it is entered by the diluate and the concentrate passes out of it. There is a freedom of choice regarding the temperature and therefore the working pressure of said boiler. In the present example a boiler at 60° C. is chosen and is therefore supplied by a heat source at 65° C. Thus, the boiler produces steam at 17 mmHg. There is a condense C in which the steam under 17 nmHg condenses in contact with an exchanger at 20° C. and is consequently supplied from a "cold" source at approximately 15° C. The entire boiler B and condenser C constitutes the desorber stage of the pump.

Thus, the thermal balance of the installation is such that the boiler B and evaporator E are at 60° C., supplied by a heat source at 65° C., the condenser C is at 20° C. and discharges into the "cold" source at 15° C. and the absorber A is at 100° C. and supplies useful heat at approximately 95° C.

Obviously these four fundamental apparatuses are connected by circulating pumps, expansion valves and recuperative heat exchangers not shown in FIG. 1.

The operating cycle of the system is represented by the Clapeyron diagram or graph (log p, T) of FIG. 2. The cycle ABCE is the steam circuit: A=absorber, B=boiler-desorber, C=condenser and E=evaporator. The cycle ABB'A is the circuit of the solution: AB=diluate, A'B'=concentrate.

As a result of the vaporization enthalpy of water ($H_v$=550 kcal/kg), which is exceptionally high, the vaporizer-condenser requires little water in order to valorize a great amount of heat. Thus, on vaporizing-condensing 1 kg of water, there is a revalorization from 65° to 95° C. of a heat quantity of 550 kcal=2.3 Mj=0.64 kWh. In a first approximation, it can be accepted that the heat transfer efficiencies of the condenser C and the absorber A are equal. Thus, the heat flux deteriorated in the condenser C is equal or only scarcely higher than that revalorized in the absorber A. In other words, the efficiency of the assembly is equal to or slightly below 50% and for two calories at 65° C. entering the system, one is valorized to 95° C. and the other degraded to 15° C. It is precisely the calories entering at 65° C. and which are valorized to 95° C., which gives the installation its status as a heat pump.

A theoretical study of absorption heat pumps e.g. appears in the "Revue Generale de Thermique", No. 320-321, August-September 1988, p 451 ff.

For the understanding of the remainder of the text, it is pointed out that there are two absorption heat pump types, which vary as a function of the separator and mixer temperatures. When the separator is at a higher temperature than the mixer, it is said that the pump is of the first or conventional type. However, when the mixer is at a higher temperature than the separator, it is said that the pump is of the second type and is sometimes also referred to as a heat transformer.

Such absorption heat pumps using binary mixtures operate in a satisfactory manner and without any major problem, but obviously in a temperature range limited towards high temperatures of approximately 150° C. in the case of an aqueous mixture. If the working fluid is constituted by organic mixtures, the operating temperatures are obviously limited to the decomposition temperatures of the constituents of the same mixture.

However, in industry there are thermal installations at high and very high temperatures, e.g. 1000° C. and higher, where large heat quantities are evacuated without being usable, because there are no heat pumps working in these temperature ranges. This is e.g. the case in steam production boilers and nuclear and non-nuclear power stations. Hitherto there has been no possibility of producing heat pumps at very high temperatures of this magnitude and such pumps have not even been envisaged.

The present invention specifically relates to working fluids for heat pumps operating at very high temperatures solving this problem in a particularly simple and unexpected manner.

The invention therefore relates to a working fluid for absorption heat pumps operating at very high temperatures of in particular 200° to 1000° C., said working fluid being a mixture of at least two constituents circulating in known manner during an operating cycle of the heat pump, firstly through a separator (formed by a desorber and a condenser), where a solution having a low concentration of solutes and referred to as the "diluted" solution is separated by evaporation-condensation into a first liquid phase constituted by a pure or almost pure solvent and a second liquid phase constituted by a concentrated solution, then through a "mixer" (formed by an evaporator and an absorber) where the solvent and the concentrated solution are remixed by evaporation-condensation in order to re-form the diluted solution, characterized in that the working fluid is constituted by a mixture of at least two chemical elements, whereof the first called a "solvent" is much more volatile than the others called "solutes", at the temperature of the mixture, the nature and portions of each of these chemical elements in the mixture being chosen in such a way that the vapour pressure of the mixture is well below that of the most volatile chemical element alone throughout the operating cycle of the working fluid in the pump.

The essential characteristic of the invention according to which the working fluid of the heat pump is a mixture of chemical elements leads to two extremely important advantages.

On the one hand, the elements are not subject to the risk, inherent in composite substances, of decomposing when the temperature rises, so that it is possible to use heat pumps at high temperature and specifically above 200° C.

On the other hand, many elements can be mixed in random proportions varying in a continuous manner, which gives a total flexibility regarding the obtaining of a fluid having clearly defined thermodynamic characteristics and which can be predicted on a Clapeyron graph. According to the invention and for this purpose, the different elements associated in the fluid are chosen in such a way that the compounds which they could possibly form between themselves are unstable and can be easily dissociated at high temperature.

According to the invention, a particularly interesting form for the working fluid for the heat pumps is that in which the chemical elements are metals which are liquid at high temperatures. Thus, the technologies of the circulation and pumping in closed circuit form of liquid metals have advanced considerably over the last twenty years, particularly as a result of research carried out in the nuclear reactor field, where certain reactors are cooled by such liquid metals. From the strictly mechanical and hydrodynamic standpoints, there are consequently no obstacles to the production of working fluids for heat pumps operating at very high temperatures if it is possible to find pairs of metals corresponding to the necessary thermodynamic properties for forming such working fluids. The Applicant has revealed that there are pairs of liquid metals in which the vapour pressure of the mixture was well below that of the first, most volatile metal, which makes it possible to produce a heat pump using said fluid.

According to an important feature of the invention, the first volatile solvent metal is constituted by mercury and the second less volatile solute metal by sodium.

Even more specifically, an ideal mixture corresponds to 0.14 kg of sodium per kg of mercury in the concentrated state of said mixture and to 0.10 kg of sodium per kg of mercury in the diluted state.

According to another interesting feature of the invention, the working fluid is formed with the aid of sodium as the first volatile metal and lead as the second metal. An ideal mixture of this type corresponds to 16.7 kg of lead per kg of sodium in the concentrated state and to 9 kg of Pb per kg of Na in the diluted state.

According to the invention, a third binary metallic mixture is formed with the aid of sodium as the first volatile metal and tin as the second metal. A particularly high performance composition of the latter metallic pair corresponds to 9.6 kg of Sn per k/g of Na in the concentrated state and to 5.2 kg of Sn per kg of Na in the diluted state.

Interesting working fluid compositions constituted by liquid metals are characterized in that the volatile solvent metal is sodium and the solute metals are lead and tin, in relative proportions between 15 and 85% of each of these two metals.

Another example of the working fluid according to the invention is characterized in that the volatile solvent metal is mercury and the solute metals are sodium and potassium in relative proportions between 15 and 85% of each of these two metals.

In this case, preferably the solute concentration (pure sodium or sodium/potassium mixture) is between 0.10 and 0.20 kg of solute/solutes per kg of mercury in the concentrated solution and 0.05 to 0.15 kg per kg in the diluted solution.

Finally, according to another embodiment of the invention, the working fluid is constituted by a "solvent" chemical element, which is a metalloid such as e.g. iodine, phosphorus or sulphur and a "solute" chemical element in the form of a metal, which is e.g. sodium. In this case, the "solute" chemical element is a metal chosen in such a way that the vapour pressure over the concentrated and diluted solutions is significantly below that of the pure metalloid alone.

The invention also relates to a certain number of applications of the aforementioned working fluid, in which the useful heat is extracted at high temperature.

A first application of the working fluid according to the invention relates to an absorption heat pump of the second or heat transformer type, operating between a hot source at a temperature between 300° and 450° C. and a cold source at a maximum temperature of 200° C., revalorizing a fraction of the heat from the hot source by raising it to a higher temperature, said temperature rise being min. 200° C. and max. 400° C.

A second application of the working fluid according to the invention relates to a heat pump of the first type associated with a steam generating boiler, characterized in that the heat pump separator is thermally intercalated between the combustion chamber and a first evaporator producing steam at between 300° and 450° C. and whose mixer revalorizes heat from a random hot source available at low temperature, i.e. at a minimum of 160° C., whilst raising its thermal levels sufficiently to heat a second evaporator producing steam at between 300° and 450° C.

A third application relates to a high efficiency, thermomechanical power station, characterized in that the steam at a temperature between 300° and 450° C. produced in the two evaporators is used for operating a turbine producing mechanical energy and in that the steam from the turbine, after expansion, is used as a low temperature heat source heating the heat pump mixer by its condensation.

Another application of the fluid according to the invention constituted by two melted liquid metals such as sodium, lead and tin relates to an absorption heat pump of the second or heat transformer type operating between a hot source at a temperature between 450° and 600° C. and a cold source at a maximum temperature of 350° C. and revalorizing a fraction of the heat from the hot source, by raising it to a higher temperature, said temperature rise being min. 200° C. and max. 400° C.

In a first application corresponding to the mixture sodium/mercury in proportions of 0.14 kg of Na per kg of Hg in the concentrated state of the mixture and to 0.10 kg of Na per kg of Hg in the diluted state, the application relates to a heat pump operating with a cold source at 110° C., a hot source at 300° C. and producing useful heat in a temperature range 430° to 520° C.

Another application of the working fluid according to the invention constituted by binary sodium/lead and sodium/tin mixtures relates to a heat pump operating with a cold source at 310° C., a hot source at 610° C. and producing useful heat in a temperature range between 700° and 800° C.

These latter applications permit the recovery of calories, which were hitherto considered as being lost, either in order to transmit them to a second water evaporator in the case of the boiler, or for reheating the feed steam of the turbine in the case of a thermal power station.

In any case, the invention will be better understood from the following description relative to FIGS. 3 to 7 and given in an illustrative and non-limitative manner and wherein show:

BRIEF DESCRIPTION OF THE DRAWINGS

On referring to the graph of FIG. 3, a description will now be given of an absorption heat pump using as the working fluid a mixture of mercury and sodium. As a function of the temperature, this graph shows the pressure of the pure mercury, the diluate and the concentrate between which evolves the aforementioned mixture. Obviously, the shape of the curves obtained remain substantially the same when the activity of the mercury in the mercury/sodium solution varies. The example which will now be described relative to FIG. 3 results from an interesting, but non-limitative choice in which use is made as the diluate of a solution of 0.10 kg of Na per kg of Hg and as the concentrate of a solution of 0.14 kg of Na per kg of Hg. The diluate solution corresponds to an activity of the mercury in the solution $a = 3.10^{-2}$, where the molarity of this solution is 0.54. The concentrate corresponds to an activity $a = 10^{-2}$ and to a molar concentration $x = 0.45$. FIG. 3 is the exact transposition of FIG. 2 given relative to the prior art and it is possible to see the two cycles A, B, C, E and A, B, B', A'. The curves in the graph show that when the vapour pressure of the pure mercury is 120 mm at a temperature of 270° C., that of the concentrate is only 1.2 mm of Hg at the same temperature. In other words, it is immediately possible to see the great interest of this Hg/Na mixture, because it is merely necessary to add 14% of Na to the Hg in order to divide the vapour pressure of the Hg by a factor of 100. This demonstrates the interest of the mixture of the liquid metals Na and Hg for forming the working fluid of a heat pump.

Figure 1:
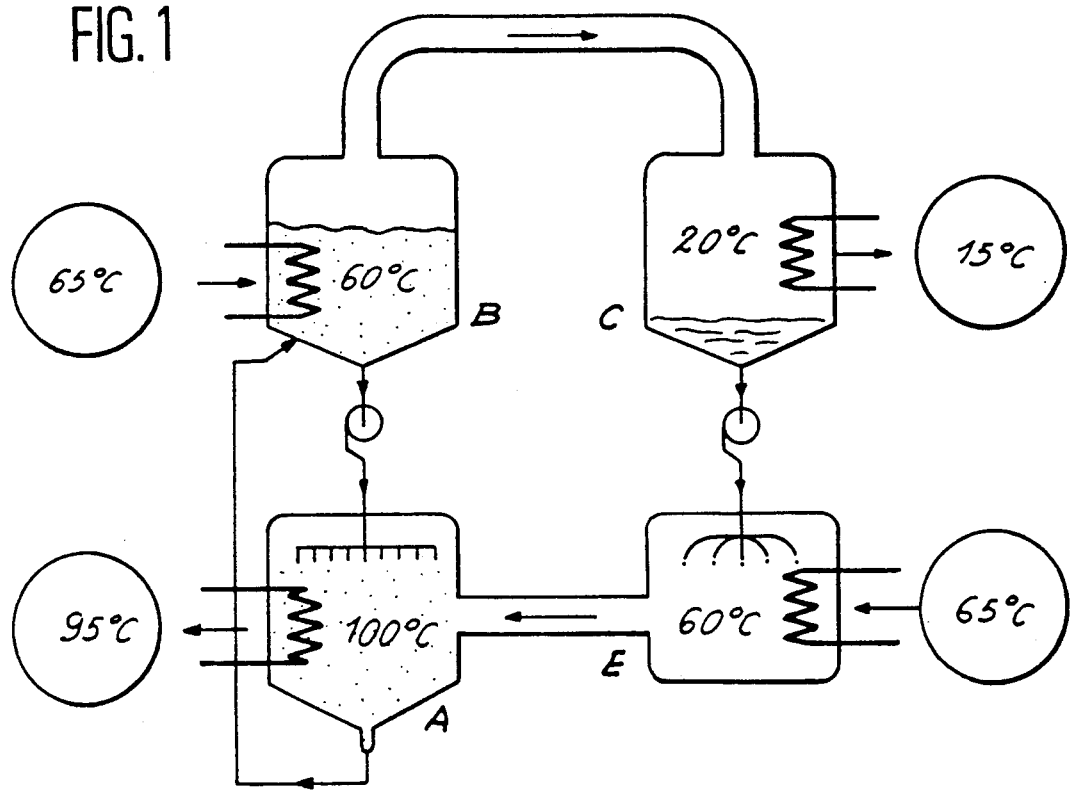
FIG. 1 is a schematic diagram demonstrating the operating principles of an absorption type heat pump.
Figure 2:
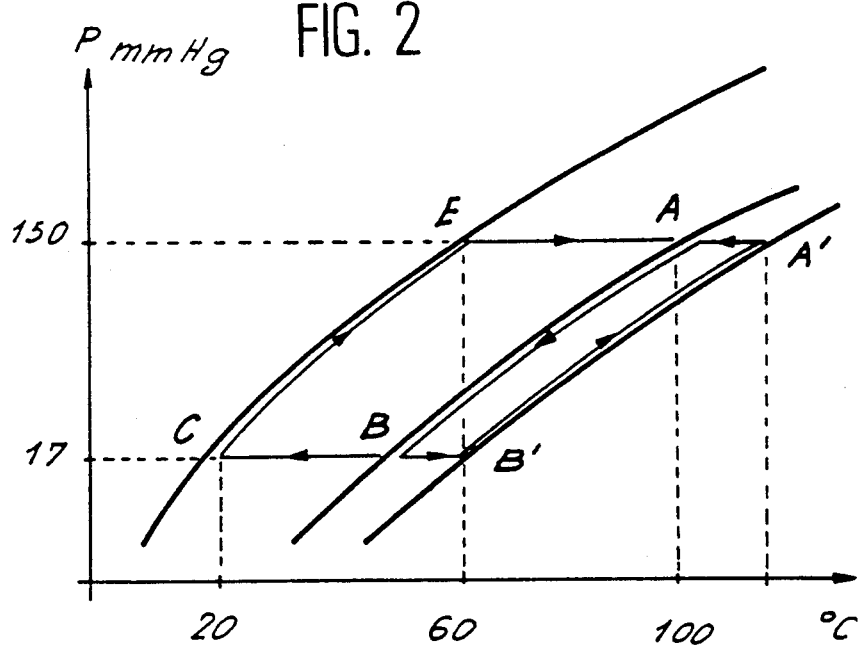
FIG. 2 is a Clapeyron diagram or graph of vapor pressure versus temperature for the apparatus schematically represented in FIG. 1.
Figure 3:
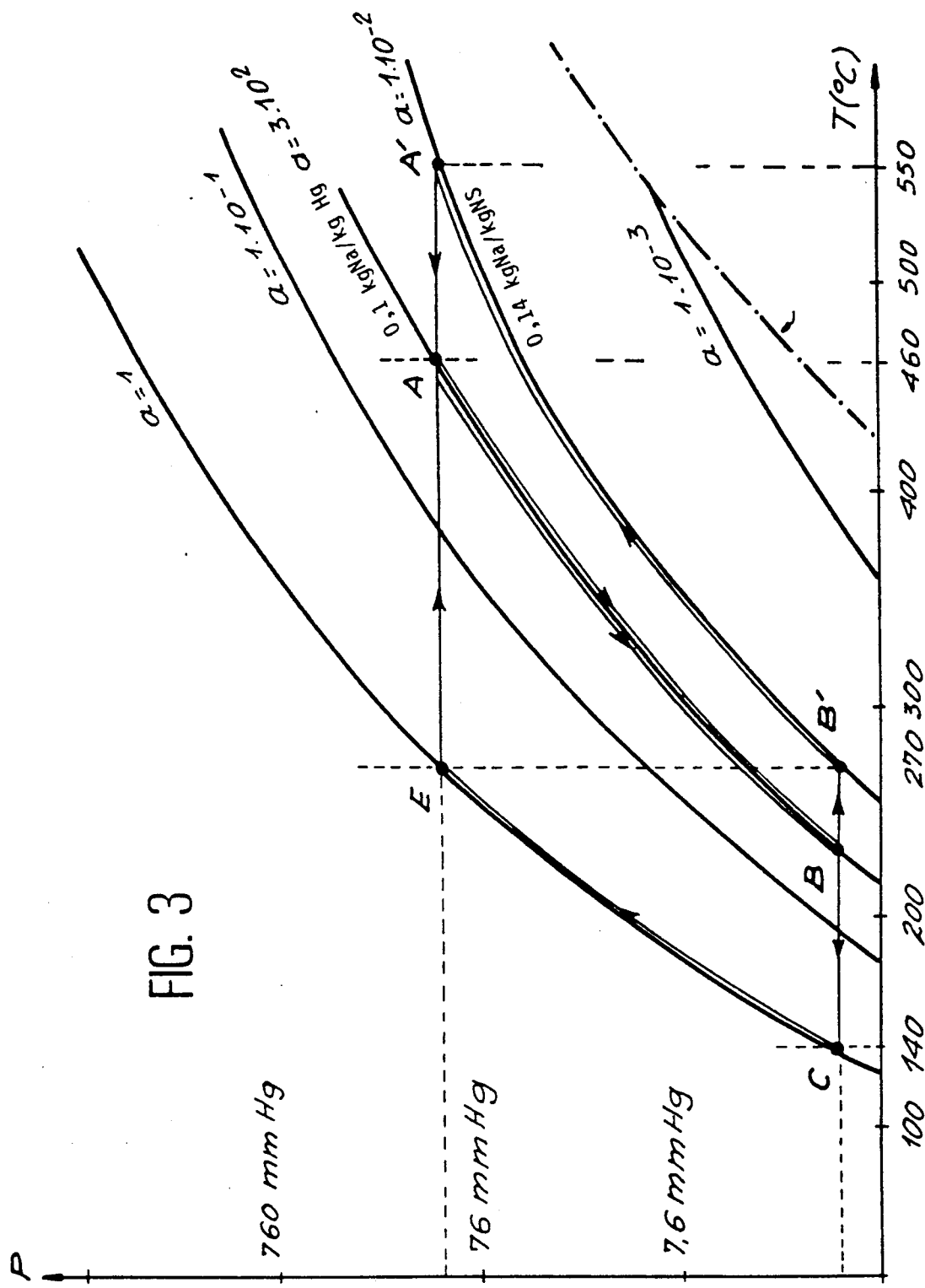
FIG. 3 A Clapeyron diagram or graph of a mercury/sodium heat pump.

The graph of FIG. 3 shows that with the aid of the diluate at 0.10 kg of Na per kg of Hg and the concentrate at 0.14 kg of Na per kg of Hg, it is possible to produce a heat pump, whereof the boiler is at 270° C., the condenser at 140° C., the evaporator at 270° C. and the absorber at approximately 460° to 550° C.

On accepting an average temperature variation of approximately 30° C. between the fluids flowing on either side of the walls of the exchangers, the heat source supplying the pump must be at 270° + 30° = 300° C. and the cold source at 140° − 30° = 110° C. This pump produces a useful heat at a temperature of 460°/550° C. − 30° C. = 430°/520° C. The calories from the heat source entering at 300° C. are consequently revalorized up to 430°/520° C., i.e. by a value of approximately 130°/220° C.

It is important to note that unlike in the case of aqueous solutions of salts (such as lithium bromide), where a limitation is imposed by the salt saturation, there is no limit of this type here, mercury and sodium being entirely miscible in the complete range of concentrations.

It is therefore very easily possible to obtain an activity "a" of Hg well below the value $a = 1.10^{-2}$ taken in the above example. For example, with mixtures of approximately 1 kg of Na per kg of Ng, the activity "a" of Hg drops below $1.10^{-3}$. The graph of FIG. 3 shows that under these conditions, at least theoretically, the thermal energy can be valorized by approximately 300° to 400° C., passing e.g. from an evaporator at 300° C. to an absorber at approximately 600°/700° C.

On referring now to the graph of FIG. 4, which relates to a working fluid formed by the mixture Na/Pb or Na/Sn, a description will be given of the cycles of a heat pump operating with the aid of one of these two fluids.

On the basis of pure Na with an activity $a = 1$, curves $a = 10-2$ and $a = 3.10^{-2}$ are obtained with the aid of the subsequent mixtures, $a = 10^{-2}$ corresponding to a concentrate formed from 9.6 kg of Sn per kg of Na or 16.7 kg of Pb per kg of Na. The activity curve corresponding to $a = 3.10^{-2}$ corresponds to a diluate obtained by a mixture of 5.2 kg of Sn per kg of Na or 9 kg of Pb per kg of Na.

Figure 4:
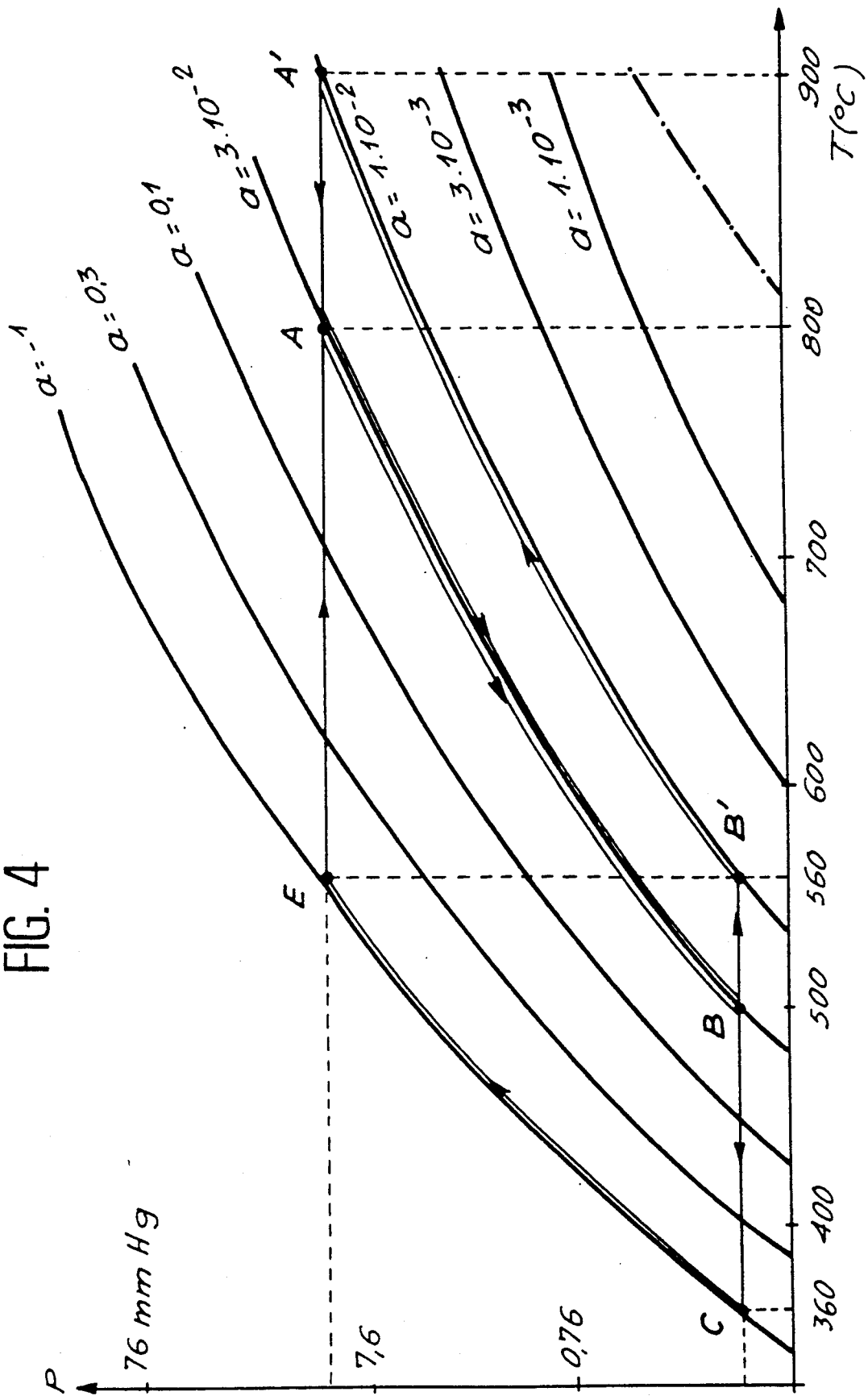
FIG. 4 A Clapeyron graph of a sodium/lead or sodium/tin heat pump.

The curves of the graph of FIG. 4 make it possible to produce a heat pump, whose boiler and evaporator are at 560° C., the condenser is at 360° C. and the absorber at 800°/900° C.

A reasonable order of magnitude for the temperature variation through the walls of the boiler-evaporator and the condenser is considered to be 50° C. and in the case of the absorber 100° C., so that the heat pump is supplied by a hot source at 610° C., it in turn supplies a cold source at 310° C. and produces useful heat at 700°/800° C.

The thermodynamic data demonstrate that a ten times lower activity of the sodium is obtained (i.e. $a = 1.5.10^{-3}$) for a molarity of 0.8 Sn in Na, which would correspond to a mixture of 20 kg of Sn and 1 kg of Na. At least theoretically, such a mixture would make it possible to raise the temperature by approximately 500° C. It would therefore be possible to produce useful heat at approximately 1000° to 1100° C. from a source at 600° C.

The vaporization enthalpy of sodium is 950 kcal/kg, i.e. 950 kcal/liter, which is a particularly interesting property. The transported heat flux per kg of Na vapour is almost twice greater than that transported by steam, which is already ten times greater than those transported by the vapours of all the organic compounds and freons.

Figure 5:
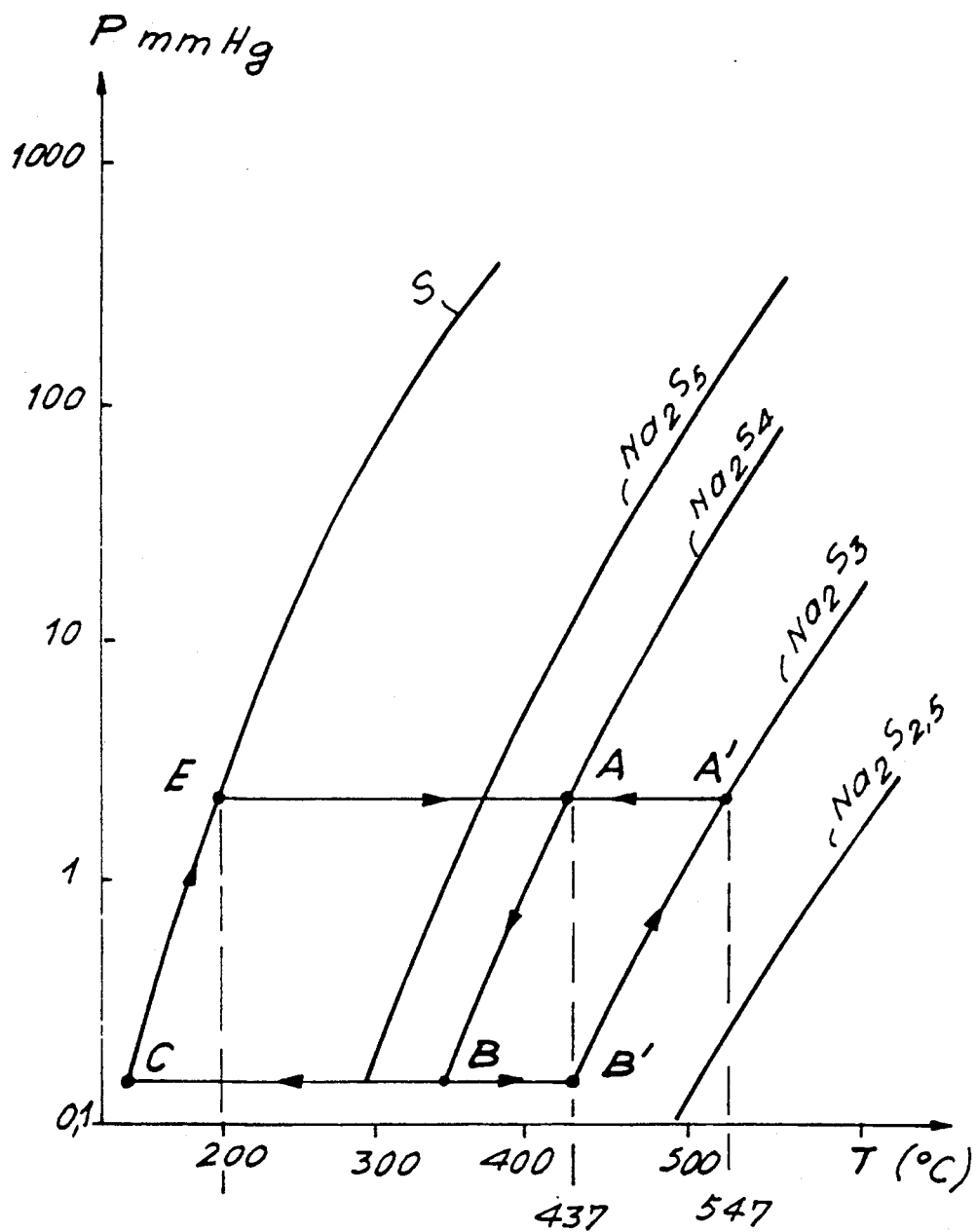
FIG. 5 A Clapeyron graph of a sulphur/sodium heat pump.

FIG. 5 is a Clapeyron graph p=f(T) in logarithmic coordinates for mixtures of sulphur and Na, as well as for different sulphides of these elements and makes it possible, in the same way as the graphs of FIGS. 3 and 4, to provide an understanding of the possibility of producing a heat pump working with such a mixture as the fluid.

Thus, the graph of FIG. 5 clearly shows the possibility when using pure sulphur and sulphide composition $Na_2S_4$, to make a heat pump operate with an absorber at 437°/547° C. and an evaporator at 200° C. In such a mixture where the solvent is sulphur and the solute is sodium, it is possible to get round the problems caused by the viscosity of the liquid sulphur through adding a little iodine.

Among the numerous applications of heat pumps with a working fluid according to the invention, reference is made to the following:

1. In the chemical and parachemical industries there are numerous furnaces, reactors, separators, etc. which use heat at 400°/500° C. (either by heating with a direct flame, or by superheated steam) and which discharge effluents at approximately 100°/400° C.

In theory, this residual heat is usable, either by supplying it to another apparatus adjacent thereto and making do with this intake temperature (but this has the major disadvantage of linking the two units and therefore reducing their operating flexibility), or for producing steam (or for superheating it) in conjunction with the general plant steam circuit, which also has numerous disadvantages.

The ideal would be to loop the apparatus back onto itself by reinjecting at the intake the calories passing out as effluents after "revalorizing" them in a heat pump. Therefore the unit maintains its independence and therefore its flexibility.

2. It is known that so-called nuclear reactors have a maximum of about 650°/750° C. However, an inventory of the possible thermal uses of this nuclear heat has revealed that it dropped into a real "hole", where there is in practice no significant application. The main fields of application are either below 500° C. (oil, organic chemistry and parachemistry) or above 900° C. (steam crackers in refineries, cement kilns, operations on glasses/ceramics).

Thus, it would be possible to envisage placing an enormous heat pump at the outlet from a nuclear reactor at 1000 MW and which would produce 500 MW of heat at 900°/1100° C. and 500 MW of heat at 300°/500° C. This would make available to the nuclear industry all transformations taking place at more than 900° C. and which are not at present possible.

Figure 6:
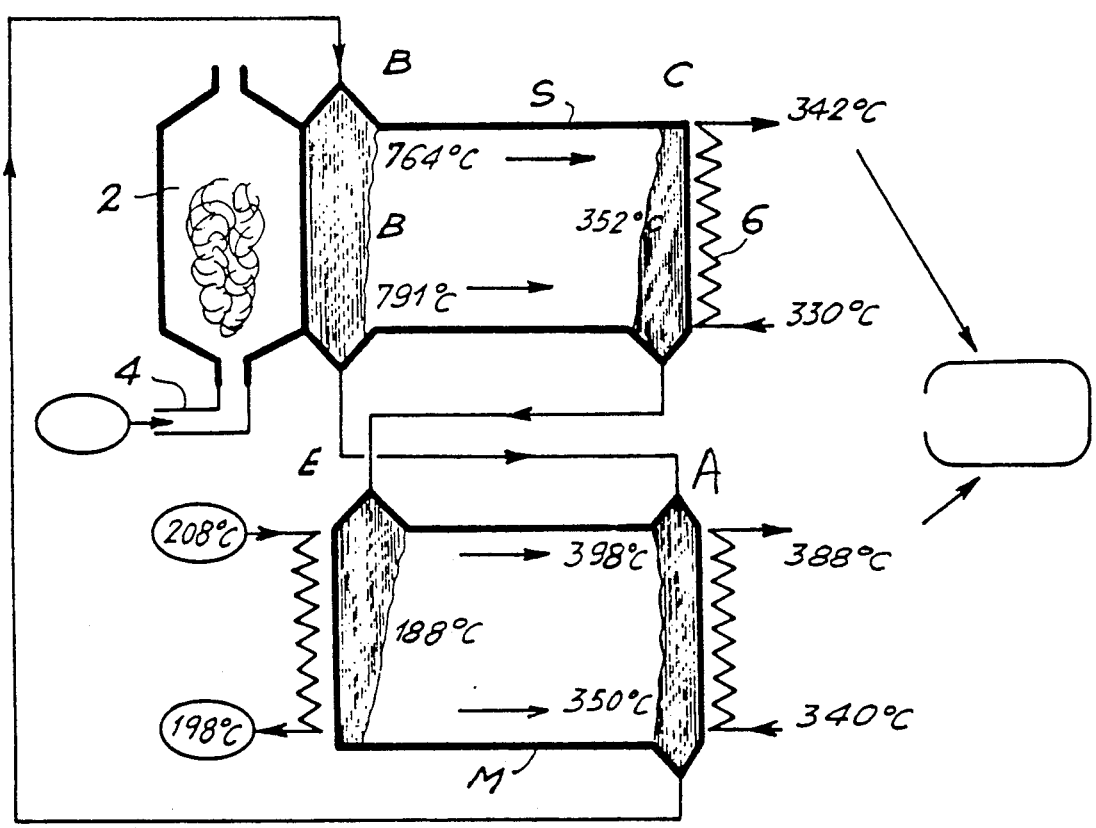
FIG. 6 A high efficiency boiler equipped with a heat pump according to the invention.

On referring now to FIG. 6, a description will be given of an exemplified application of the working fluid according to the invention to the production of a high efficiency boiler for producing steam. FIG. 6 shows the separator S and the mixer M of an absorption heat pump using the pair of liquid metals Hg-Na and operating at medium pressure The separator S incorporates the desorber B and the condenser C and mixer M the evaporator E and the absorber A.

In the installation of FIG. 6, it is possible to see the combustion chamber 2 of a steam boiler, at whose base 4 is injected fuel for maintaining combustion. According to the invention, this combustion chamber 2 is directly associated with the desorber B of the separator S for which it serves as the heat source. The separator S is placed between the combustion chamber 2 and a first water evaporator 6, into which enters the pressurized liquid water at 330° C. and leaves it in the steam state at 342° C. It is this water which cools the condenser C operating at 352° C. The mixer stage M is supplied by a heat source without value, e.g. the combustion fumes from the boiler and whose calories enter the evaporator at 208° C. and pass out of it at 198° C. The boiler B of the separator operates at between 791° and 764° C., whilst the condenser is at 352° C., the system being under a pressure of 700 mm of Hg.

The first evaporator 6 is traversed by water which is heated to 332° from 342° C. The mixer M is under a pressure of 12 mm of Hg, the evaporator works at 188° C. and the absorber between 350° and 398° C. This useful heat is transmitted to a second pressurized water circuit entering in liquid form at 340° C. and leaving in steam form at 388° C. Thus, there are two steam productions, one at 342° C. by the heat from the separator S and the other at 388° C. by the heat from the mixer M.

Figure 7:
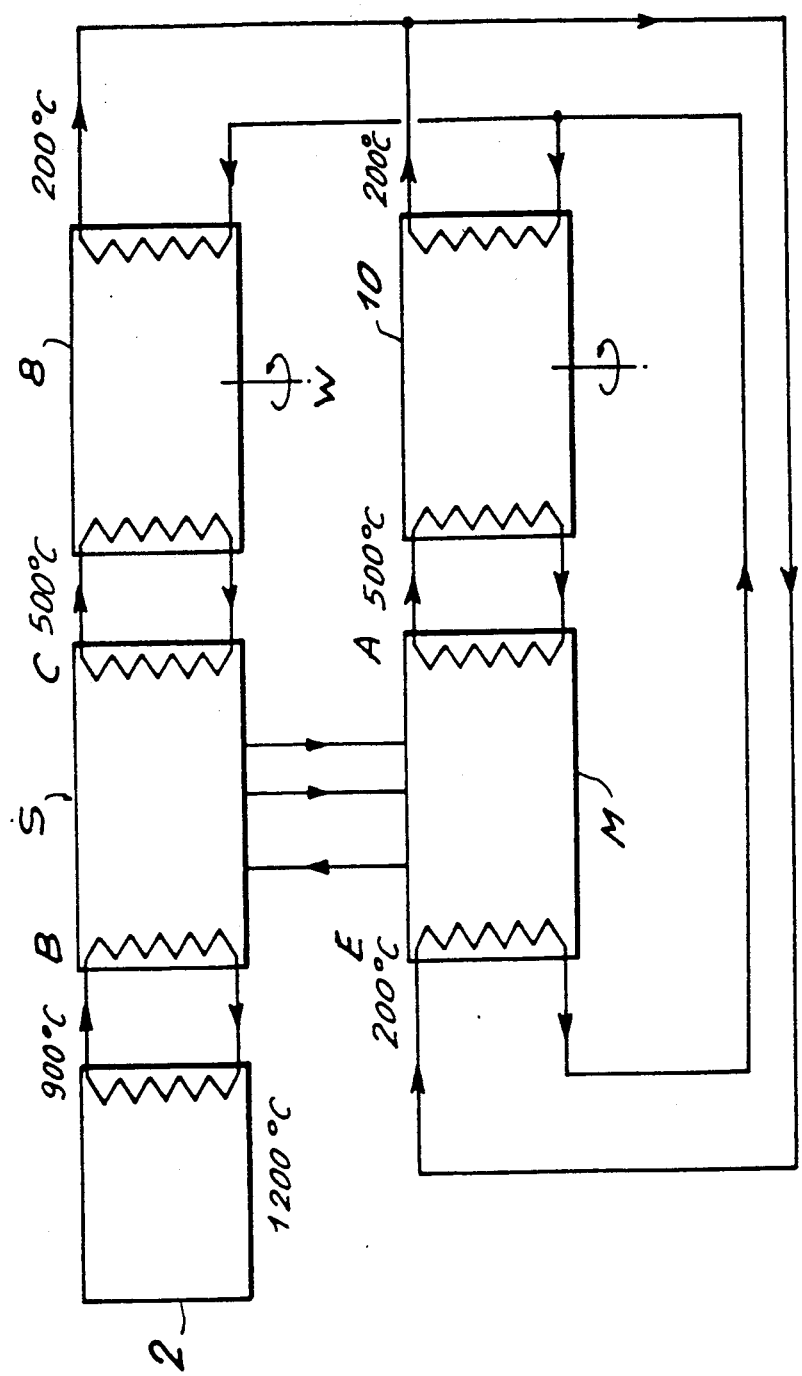
FIG. 7 The diagram of a high efficiency thermal power station equipped with a heat pump according to the invention.

Finally, relative to FIG. 7, a description will be given of a high efficiency thermal power station using the working fluid according to the invention. As can be seen in FIG. 7, the installation has between a combustion chamber 2 of the power station boiler and two steam turbines 8 and 10, a liquid mixture heat pump having separator S and a mixer M. The diagram gives the intake and discharge temperatures in each of the components of the installation and it is possible to see that the combustion chamber 2 heats to 900° C. the boiler-desorber B of the separator S, the condenser C of the latter supplying steam at 500° C. into the first turbine 8. After expansion in the first turbine 8, the steam leaving at 200° C. is reinjected into the mixer M of the heat pump, which revalorizes the calories up to 500° C. to inject then into a second steam turbine 10.

Instead of using two steam turbines, a variation would consist of reinjecting the steam recovered in this way and revalorized to 500° C. into a single, larger turbine.

We claim:

1. In a method of using a working fluid in absorption heat pumps operating at very high temperatures in the range of 200° to 1000° C., said working fluid being a mixture of at least two constituents circulating in known manner during an operating cycle of the heat pump, firstly through a separator formed by a desorber and a condenser where a diluted solution having a low concentration of solute is separated by evaporation-condensation into a first liquid phase constituted by a pure or almost pure solvent and a second liquid phase constituted by a concentrated solution, then through a mixer formed by an evaporator and an absorber where the solvent and the concentrated solution are remixed by evaporation-condensation in order to re-form the diluted solution, wherein the working fluid is constituted by a mixture of two metals, whereof the first acts as a solvent and is much more volatile than the second which acts as solute, and the volatile solvent metal is mercury and the less volatile solute metal is sodium, the sodium concentration used as the solute being between 0.10 and 0.20 kg of solute per kg of mercury in the concentrated solution and between 0.05 and 0.15 kg per kg of mercury in the diluted solution.

* * * * *